US012674551B2

(12) United States Patent
Greber et al.

(10) Patent No.: US 12,674,551 B2
(45) Date of Patent: Jul. 7, 2026

(54) CRYOGENIC FLUID STORAGE UNIT

(71) Applicant: Faurecia Hydrogen Solutions France, Nanterre (FR)

(72) Inventors: Frédéric Greber, Ecot (FR); Yannick Fourcaudot, Luze (FR)

(73) Assignee: Faurecia Hydrogen Solutions France (FR)

(*) Notice: Subject to any disclaimer, the term of this patent is extended or adjusted under 35 U.S.C. 154(b) by 58 days.

(21) Appl. No.: 18/883,040

(22) Filed: Sep. 12, 2024

(65) Prior Publication Data

US 2025/0092999 A1 Mar. 20, 2025

(30) Foreign Application Priority Data

Sep. 19, 2023 (FR) ....................................... 2309892

(51) Int. Cl.
*F17C 13/04* (2006.01)

(52) U.S. Cl.
CPC ...... *F17C 13/04* (2013.01); *F17C 2205/0385* (2013.01); *F17C 2205/0394* (2013.01); *F17C 2223/0161* (2013.01)

(58) Field of Classification Search
CPC ........ F17C 2205/0305; F17C 2203/018; F17C 2203/0391; F17C 2203/0629; F17C 13/001; F17C 2223/0161; F17C 2203/014; F17C 13/06; F17C 1/12; F17C 3/08

See application file for complete search history.

(56) References Cited

U.S. PATENT DOCUMENTS

| | | | | |
|---|---|---|---|---|
| 3,272,579 A * | 9/1966 | Leonard | F17C 3/08 220/592.27 |
| 5,651,473 A * | 7/1997 | Preston | F17C 13/001 220/592.27 |
| 2005/0139600 A1 | 6/2005 | Harper et al. | |
| 2020/0355324 A1* | 11/2020 | Houel | F17C 13/001 |
| 2022/0042651 A1 | 2/2022 | Fournel | |
| 2023/0272881 A1 | 8/2023 | Fayer | |

FOREIGN PATENT DOCUMENTS

| | | |
|---|---|---|
| CN | 101718391 A | 6/2010 |
| CN | 112066251 A | 12/2020 |

OTHER PUBLICATIONS

Preliminary Research Report for French Application No. 2309892 dated May 9, 2024.

* cited by examiner

*Primary Examiner* — Stephen J Castellano
(74) *Attorney, Agent, or Firm* — Carlson, Gaskey & Olds, P.C.

(57) ABSTRACT

A storage unit comprises an internal reservoir inwardly delimiting a cryogenic fluid storage volume, an external reservoir housing the internal reservoir and a suspension attaching the internal reservoir to the external reservoir. The suspension has a connection which comprises an outer tube, a bottom plate, an inner tube arranged inside the outer tube, and a movement limiter. The outer tube has an outer proximal end attached to the internal reservoir and an outer distal end located inside the storage volume The bottom plate closes the outer distal end. The inner tube has an inner proximal end connected to the external reservoir and an inner distal end attached to the internal reservoir. The movement limiter limits deflection of the inner tube relative to the internal reservoir in a plane perpendicular to a central axis of the inner tube.

11 Claims, 5 Drawing Sheets

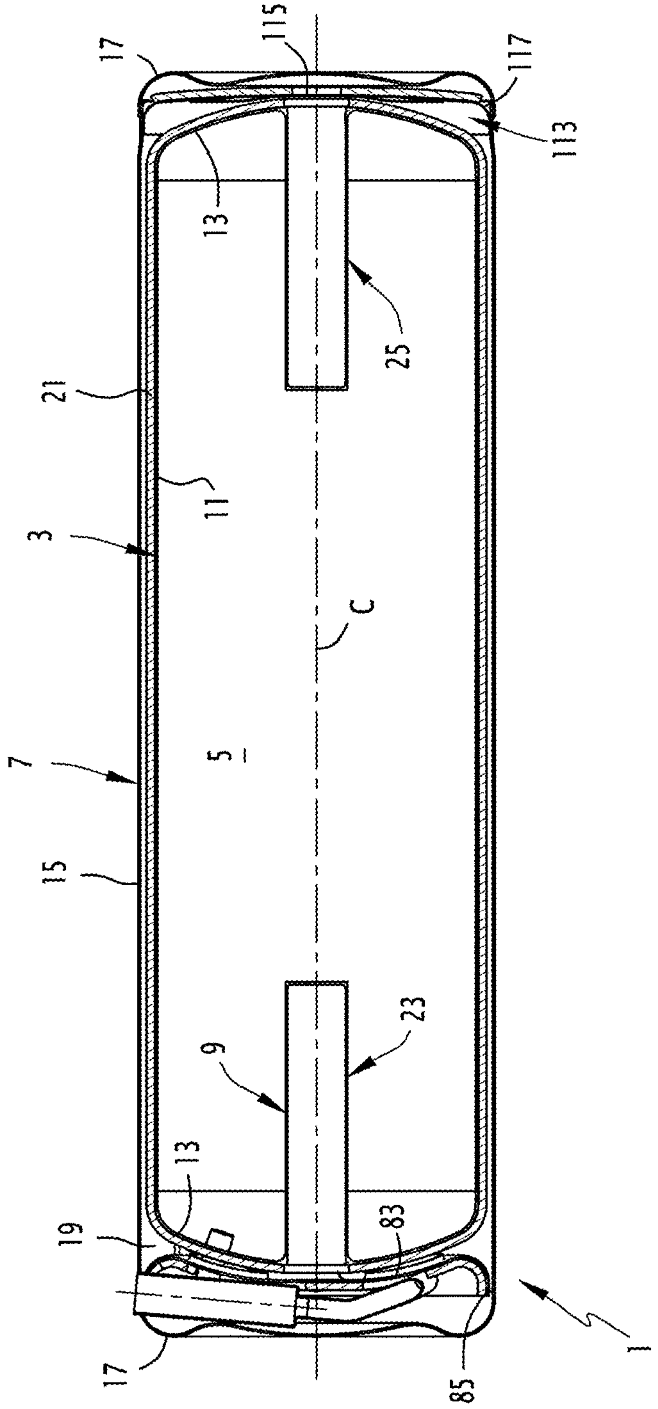
[Fig. 1]

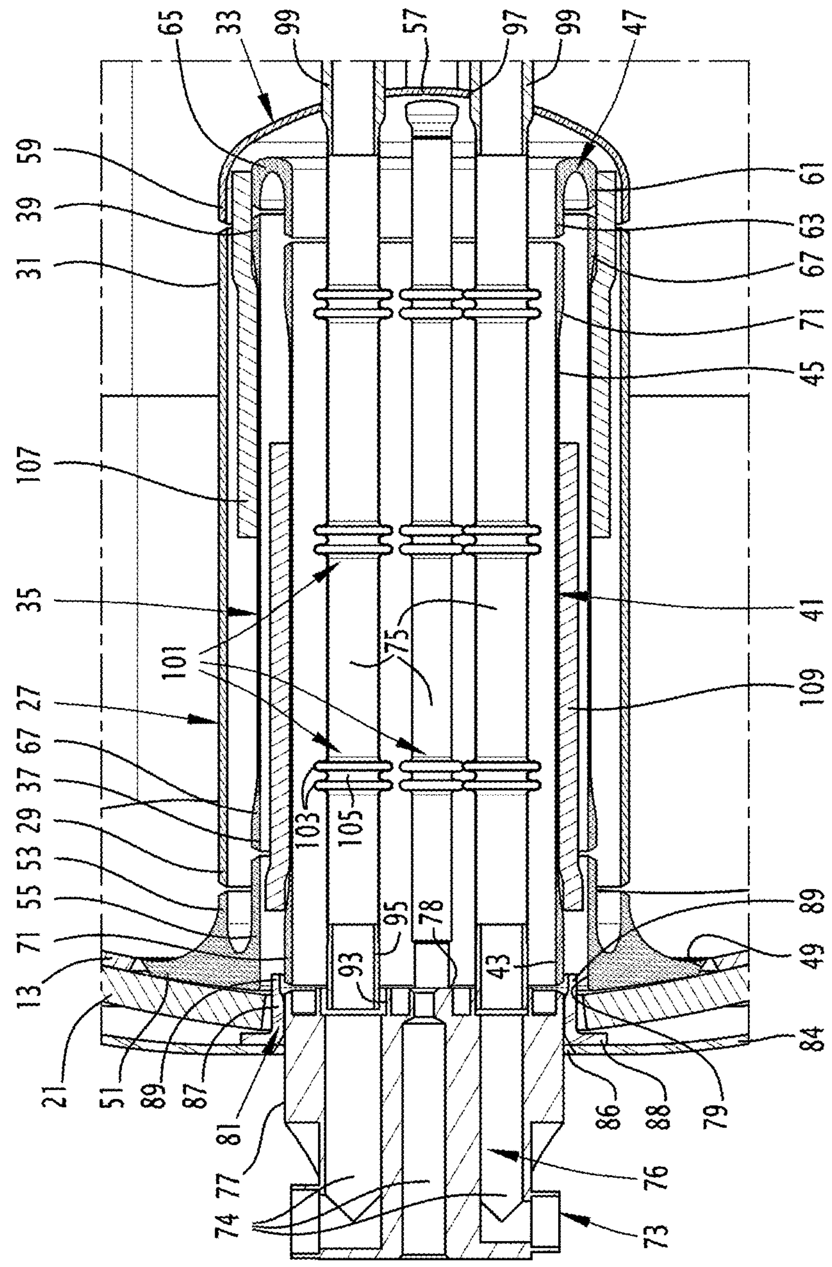
[Fig. 2]

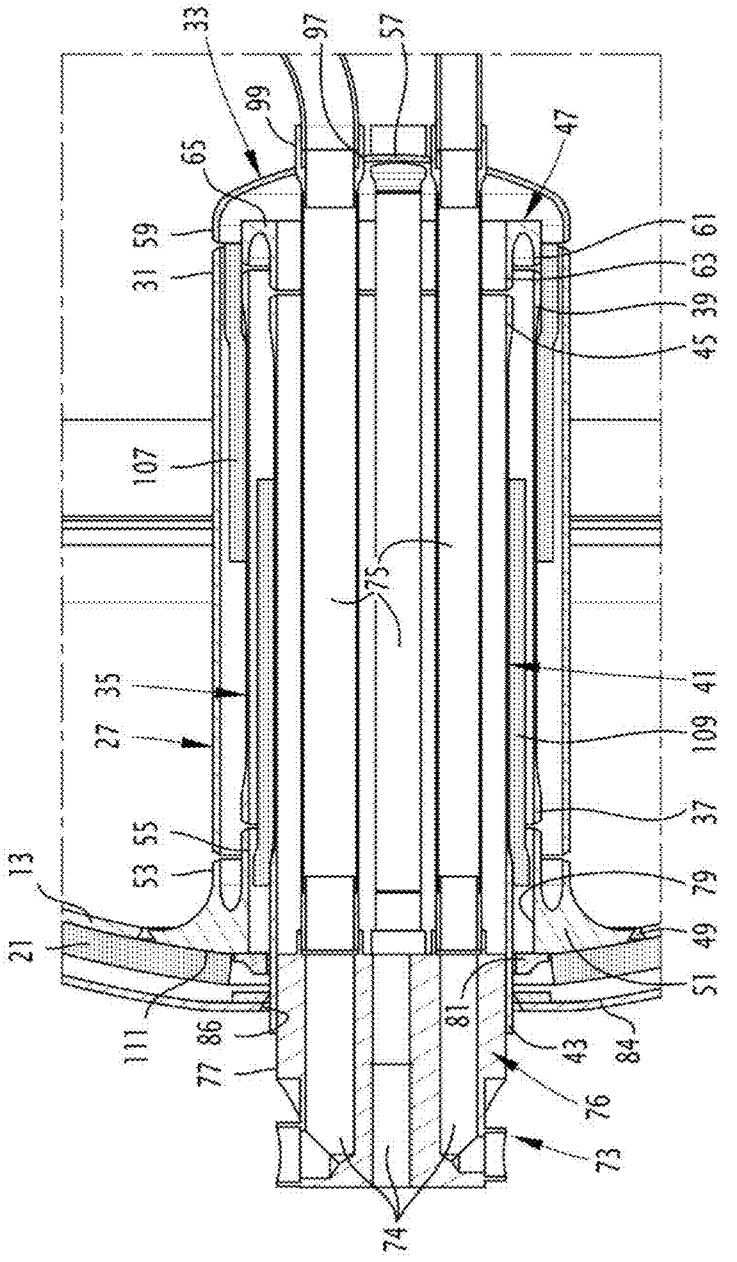
[Fig. 3]

[Fig. 4]
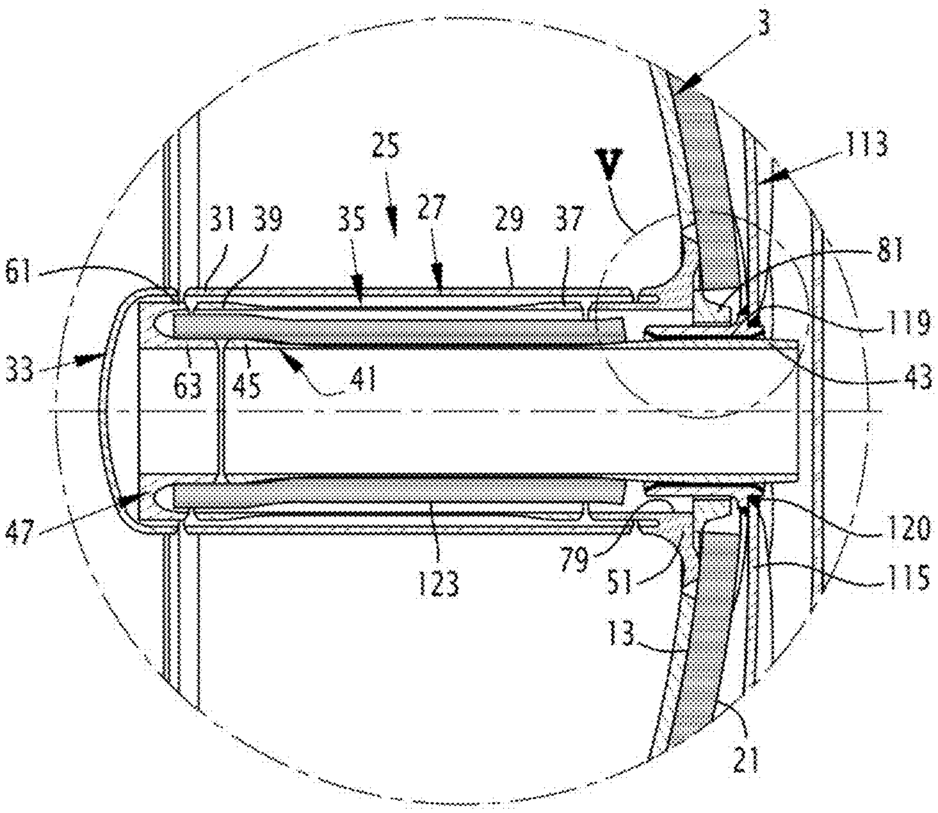

[Fig. 5]
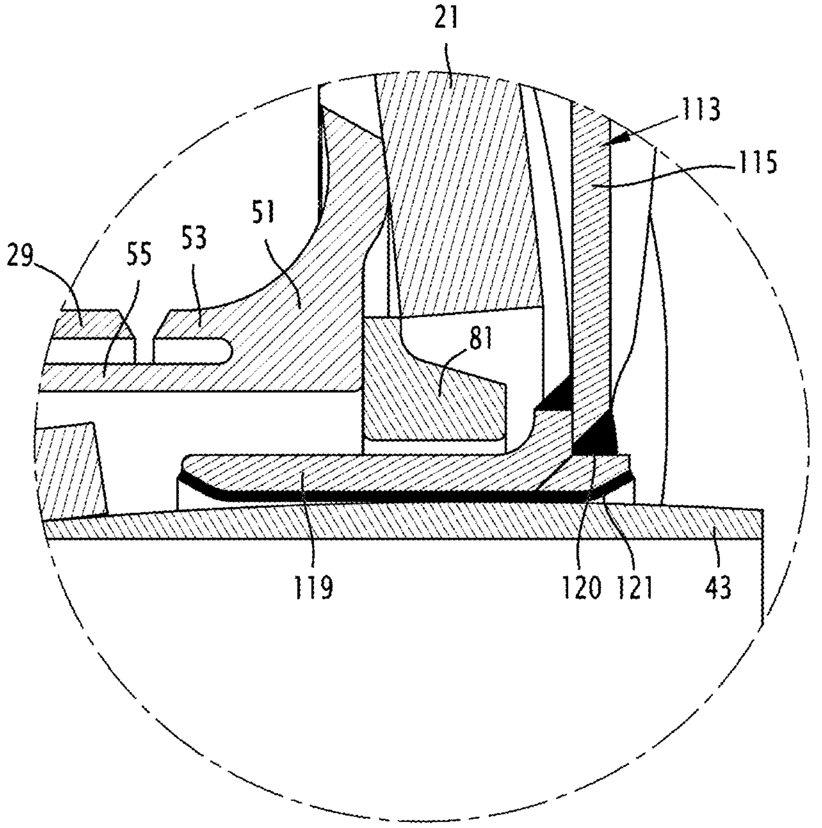

CRYOGENIC FLUID STORAGE UNIT

CROSS-REFERENCE TO RELATED APPLICATION

This application is a U.S. non-provisional application claiming the benefit of French Application No. 2309892, filed on Sep. 19, 2023, which is incorporated herein by reference in its entirety.

TECHNICAL FIELD

The present disclosure relates in general to a cryogenic fluid storage unit.

BACKGROUND

Such a storage unit may comprise an internal reservoir inwardly delimiting a cryogenic fluid storage volume, an external reservoir housing the internal reservoir and a suspension attaching the internal reservoir to the external reservoir.

To limit convective heat transfer from the external reservoir to the internal reservoir, the space between the internal and external reservoirs is typically kept under a high vacuum.

Radiation transfer is limited by placing a layer of insulating material on the internal reservoir.

Conductive heat transfer from the external reservoir to the internal reservoir takes place mainly via the suspension.

It can be relatively high.

SUMMARY

A storage unit is provided whose suspension is designed to minimize the heat flow circulating by conduction from the external reservoir to the internal reservoir.

To this end, a first embodiment of the disclosure relates to a cryogenic fluid storage unit, comprising an internal reservoir inwardly delimiting a cryogenic fluid storage volume, an external reservoir housing the internal reservoir and a suspension attaching the internal reservoir to the external reservoir, the suspension comprising a connection which comprises:

- an outer tube having an outer proximal end attached to the internal reservoir and an outer distal end located inside the storage volume;
- a bottom plate closing the distal outer end;
- an inner tube arranged inside the outer tube, having an inner proximal end directly attached to a rigid member connected to the external reservoir and having an inner distal end attached to the internal reservoir;
- a movement limiter, limiting deflection of the inner tube relative to the internal reservoir in a plane perpendicular to a central axis of the inner tube, the movement limiter:
- either being attached to the rigid member and/or to the inner proximal end;
- or being attached to the internal reservoir and engaging with the rigid member and/or the inner proximal end.

The inner tube is designed only to withstand the usual mechanical stresses associated with normal storage use. When the storage unit is installed on board a motor vehicle, these stresses result, for example, from emergency braking, a hairpin bend, or the vibrations generated by the vehicle traveling over roads in poor condition.

Conversely, if the storage unit is subjected to exceptional stress, such as an accidental impact, the movement limiter limits the deflection of the inner tube in a plane perpendicular to the central axis of the inner tube.

This limits deformation of the inner tube, preventing it from entering the plastic range and thus undergoing irreversible deformation.

In the absence of a movement limiter, the likelihood of damage to the inner tube in the event of exceptional stress would be significant.

The movement limiter is attached or engages with an element having greater rigidity than the central portion of the inner tube, which is mechanically less resistant. This element is the rigid member through which the inner tube is attached to the external reservoir, and/or the inner proximal end. The inner proximal end, due to the fact that it is directly attached to the rigid member, has a better mechanical resistance than the central portion of the inner tube.

Thus, the movement limiter makes it possible to select a reduced wall thickness for the inner tube, just sufficient to withstand the usual mechanical stresses. This helps limit heat transfer by conduction from the external reservoir to the internal reservoir.

The fluid storage unit may further comprise one or more of the following features, considered alone or according to any technically possible combinations:

- the internal reservoir has an orifice through which the inner tube is connected to the external reservoir, the movement limiter engaging with the orifice to limit the deflection of the inner tube;
- the storage unit comprises:
- a valve block having at least one internal passage for the cryogenic fluid;
- at least one circulation tube extending inside the inner tube and fluidly connecting the at least one internal passage to the storage volume;
- the rigid member being the valve block;
- the movement limiter has a specific axial length and is engaged in the orifice over a length of less than 50% of said specific length;
- the movement limiter is a sleeve arranged around the valve block and/or the inner proximal end;
- the connection comprises a first cup having a first central portion rigidly attached directly to the valve block and/or to the inner proximal end, and a first edge rigidly attached to the external reservoir, the movement limiter comprising a cylindrical portion arranged around the valve block and/or the inner proximal end and rigidly attached to the valve block and/or to the inner proximal end, the movement limiter further comprising a protruding flange rigidly attached to the first cup;
- the movement limiter is a ring attached to the internal reservoir;

According to another embodiment, constituting a variant to the first embodiment, the disclosure relates to a cryogenic fluid storage unit, comprising an internal reservoir inwardly delimiting a cryogenic fluid storage volume, an external reservoir housing the internal reservoir and a suspension attaching the internal reservoir to the external reservoir, the suspension comprising a connection comprising:

- an external tube having an outer proximal end attached to the internal reservoir and an outer distal end located inside the storage volume;
- a bottom plate closing the outer distal end;

an inner tube arranged inside the outer tube, having an inner proximal end connected to the external reservoir and an inner distal end attached to the internal reservoir;

a second cup having a second central portion and a second edge rigidly attached to the external reservoir;

a sliding tube passing through a second orifice in the second central portion and rigidly attached to the second central portion, the inner proximal end being slidably engaged in the sliding tube;

a movement limiter, limiting deflection of the inner tube relative to the internal reservoir in a plane perpendicular to a central axis of the inner tube, the movement limiter:

either being attached to the sliding tube;

or being attached to the internal reservoir and engaging with the sliding tube.

In addition, the storage unit may be such that the sliding tube extends opposite the movement limiter perpendicular to the central axis.

According to both embodiments, advantageously, the connection may comprise a plurality of tubes coaxial with each other and arranged inside each other, the inner tube belonging to the plurality of tubes and being the innermost tube of the plurality of tubes.

BRIEF DESCRIPTION OF THE DRAWINGS

Other features and advantages of the disclosure will become apparent from the detailed description given hereunder, by way of non-limiting indication, referring to the appended figures, among which:

FIG. 1 is an axial sectional view of the cryogenic fluid storage unit;

FIG. 2 is an enlarged axial section view of part of the storage unit suspension of FIG. 1 according to the first embodiment;

FIG. 3 is a view similar to that of FIG. 2, showing a variant of the first embodiment, FIG. 4 is a view similar to that of FIG. 2, showing a second embodiment for a connection that does not provide for the passage of cryogenic fluid ducts; and FIG. 5 is an enlarged view of a detail V of FIG. 4.

DETAILED DESCRIPTION

In FIGS. 2 to 5, some of the welds connecting the parts to one another are not shown.

The storage unit 1 shown in FIG. 1 is intended to store a cryogenic fluid.

Cryogenic fluid is understood to mean a fluid at a very low temperature, which may be at least partially in the liquid state inside the storage unit.

This fluid is typically hydrogen. Alternatively, the fluid is helium, nitrogen, natural gas such as methane $CH_4$, air or any other suitable fluid.

This storage unit is typically provided to be installed on board a vehicle having an electric propulsion motor, for example a motor vehicle, a train, a boat or any other vehicle.

The motor vehicle is, for example, a car, a utility vehicle, a truck, etc.

The storage unit 1 is designed to power a fuel cell. The fuel cell is configured to produce electricity, and to supply electricity to the electric propulsion motor of the vehicle.

The cryogenic fluid storage unit 1 comprises an internal reservoir 3 inwardly delimiting a cryogenic fluid storage volume 5, an external reservoir 7 housing the internal reservoir 3, and a suspension 9 attaching the internal reservoir 3 to the external reservoir 7.

In the example shown, the internal reservoir 3 has a horizontal central axis C.

The internal reservoir 3 comprises a shell 11, closed at both axial ends by bottoms 13.

The shell 11 is cylindrical, centered on the central axis C.

The external reservoir 7 also typically has a horizontal axis.

The external reservoir 7 comprises a shell 15, closed at both axial ends by bottoms 17.

The shell 15 is cylindrical, centered on the central axis C.

The internal reservoir 3 and the external reservoir 7 delimit an intermediate space 19 therebetween, kept under a high vacuum.

This vacuum is typically of the order of $10^{-5}$ mbar, so as to strongly limit heat transfer by convection from the external reservoir 7 to the internal reservoir 3.

Thermal insulation 21 is interposed between the internal reservoir 3 and the external reservoir 7. The thermal insulation 21 is typically placed on the external surface of the internal reservoir 3. The thermal insulation 21, for example, comprises a plurality of metal sheets superimposed on one another, with interposition of fiber layers.

The suspension 9 is arranged so that the entire weight of the internal reservoir 3 is taken up by the external reservoir 7 via the suspension 9.

The weight of the internal reservoir 3 is understood here to include the weight of the cryogenic fluid stored in the internal reservoir 3.

The accelerations undergone by the internal reservoir 3 and the cryogenic fluid contained in the internal reservoir 3 are also transmitted to the external reservoir 7 via the suspension 9.

When the storage unit 1 is installed in a vehicle, these accelerations result from changes in vehicle direction, braking or acceleration of the vehicle, asperities or irregularities in the road, or impacts to the vehicle.

In the example shown, the suspension 9 comprises two connections 23, 25.

The connections 23, 25 each suspend one of the two opposite axial ends of the internal reservoir 3 from the external reservoir 7.

The connections 23 and 25 are different from one another.

The connection 23 is designed to allow cryogenic fluid to flow into the storage volume 5, or out of the storage volume 5.

In contrast, the connection 25 is not designed for the passage of cryogenic fluid.

As shown in FIG. 2, the connection 23 comprises:

an outer tube 27 having an outer proximal end 29 attached to the internal reservoir 3 and an outer distal end 31 located inside the storage volume 5;

a bottom plate 33 closing the outer distal end 31;

an inner tube 41 arranged inside the outer tube 27, having an inner proximal end 43 directly attached to a rigid member connected to the external reservoir 7 and an inner distal end 45 attached to the internal reservoir 3.

The connection 23 also comprises:

an intermediate tube 35 arranged inside the outer tube 27, having an intermediate proximal end 37 attached to the internal reservoir 3 and an intermediate distal end 39; and an annular ring 47 connecting the intermediate distal end 39 to the inner distal end 45.

Thus, the inner distal end 45 is attached to the internal reservoir 3 via the annular ring 47 and the intermediate tube 35.

The outer tube 27 is substantially cylindrical, and is coaxial with the central axis C.

The outer tube 27 is located inside the storage volume 5, typically entirely inside the storage volume 5.

An opening 49 is provided in the bottom 13 of the internal reservoir 3. An inner ring 51 is engaged in the opening 49 and is rigidly attached to the bottom 13. The outer peripheral edge of the inner ring 51 is tightly welded to the edge of the opening 49.

On a side facing the storage volume 5, the inner ring 51 has a substantially cylindrical outer rib 53.

The outer rib 53 is coaxial with the central axis C, and has approximately the same diameter as the outer proximal end 29.

The outer proximal end 29 is tightly welded to the outer rib 53.

Similarly, the inner ring 51 has a second, substantially cylindrical rib 55 on its side facing the storage volume 5.

This second rib 55 is coaxial with the central axis C, and has the same diameter as the intermediate proximal end 37.

The intermediate proximal end 37 is tightly welded to the second rib 55.

The bottom plate 33 seals the outer distal end 31. The bottom plate 33 has a bottom 57 extended by an upright edge 59 tightly welded to the outer distal end 31.

The bottom 57 is curved toward the inside of the storage volume 5.

The annular ring 47 is coaxial with the central axis C.

The annular ring 47 has U-shaped cross sections in radial planes containing the central axis C. The annular ring 47 thus has an outer cylindrical wall 61 and an inner cylindrical wall 63, connected to one another by a base 65.

The outer wall 61 has substantially the same diameter as the intermediate distal end 39, and is welded to this intermediate distal end 39.

The inner wall 63 has substantially the same diameter as the inner proximal end 45, and is welded thereto.

The intermediate tube 35 has a wall thickness of between 0.5 mm and 2.5 mm, preferably between 0.5 and 1.5 mm, for example 1 mm.

The intermediate tube 35 is made of an austenitic stainless steel with, for example, an Rp 0.2 of 270 MPa. Typically, the intermediate tube 35 is made of stainless steel grade 1.4310 or type 304.

The intermediate proximal end 37 and the intermediate distal end 39 are, for example, encircled by sleeves 67, so as to increase the rigidity of the connection to the rib 55 and the connection to the outer wall 61, respectively.

Similarly, the inner tube 41 has a wall thickness of between 0.5 mm and 2.5 mm, preferably between 0.5 and 1.5 mm, for example 1 mm.

The inner tube 41 is made of an austenitic stainless steel with, for example, an Rp 0.2 of 270 MPa. Typically, the inner tube 41 is made of stainless steel grade 1.4310 or type 304.

The inner proximal end 43 and the inner distal end 45 are, for example, encircled by sleeves 71, so as to increase the rigidity of the connection to the inner wall 63 and the connection to the rigid member, respectively.

The storage unit comprises a valve block 73 having at least one internal passage 74 for the cryogenic fluid.

The storage unit 1 also comprises at least one circulation tube 75 extending inside the inner tube 41 and fluidly connecting the at least one internal passage 74 to the storage volume 5.

Typically, the valve block 73 comprises four internal passages 74, connected to four circulation tubes 75.

In this case, one of the passages 74, and the corresponding tube 75, are provided for filling the storage volume 5. Another passage 74, and the corresponding tube 75, are provided for emptying the storage volume 5.

The two other passages 74, and the two other corresponding tubes 75, are designed to circulate the cryogenic fluid to a heat exchanger, in a loop.

The rigid member is advantageously the valve block 73. Said valve block is attached directly to the inner proximal end 43 of the inner tube 41.

The valve block 73 is placed axially in line with the inner tube 41.

Toward the inner tube 41, it has a substantially cylindrical end portion 76.

The end portion 76 is coaxial with the central axis C. The end portion 76 is bounded radially outwardly by an outer surface 77, and axially toward the inner tube 41 by a connecting surface 78.

The outer surface 77 is substantially cylindrical. Its cross section perpendicular to the central axis C is substantially identical to that of the inner proximal end 43.

The inner proximal end 43 is connected to the peripheral edge of the connecting surface 78.

The internal reservoir 3 also comprises an orifice 79 through which the inner tube 41 is connected to the external reservoir 7.

The orifice 79 is provided in the inner ring 51. The sub-assembly consisting of the valve block 73 and the inner tube 41 passes through the orifice 79.

Thus, the space delimited inside the outer tube 27 is isolated from the storage volume 5, but communicates with the intermediate space 19 through the orifice 79.

Advantageously, the connection 23 comprises a movement limiter 81, limiting deflection of the inner tube 41 relative to the internal reservoir 3 in a plane perpendicular to the central axis of the inner tube 41.

The movement limiter 81 limits the deflection of the inner tube 41 relative to the internal reservoir 3 to a maximum of less than 3 mm.

In the example shown, the central axis of the inner tube 41 corresponds to the central axis C. The deflection of the inner tube 41 is taken at the inner proximal end 43. It corresponds to the radial offset of the inner proximal end 43 from its rest position.

As noted above, the maximum is set at a value of less than 3 mm, typically between 1.5 and 2.5 mm, for example 2 mm.

The movement limiter 81 engages with the orifice 79 to limit the deflection of the inner tube 41.

The movement limiter 81 is rigidly attached to the rigid member, that is, to the valve block 73.

Alternatively, the movement limiter 81 is attached at the inner proximal end 43.

According to another variant, the movement limiter 81 is attached to both the rigid member and the inner tube 41.

The movement limiter 81 is a sleeve arranged around the inner proximal end 43. The radial distance between the movement limiter 81 and the inner surface of the orifice 79 thus corresponds to the maximum deflection of the inner tube 41.

Advantageously, the connection 23 comprises a first cup 83 whose first central portion 84 faces the bottom 13 of internal reservoir 3 and whose first edge 85 is rigidly attached to the inner surface of external reservoir 7. It is, for example, of the type disclosed in the patent application filed under number FR2211366.

The first central portion 84 of the cup 83 is oriented substantially perpendicular to the central axis C. The first central portion 84 has a first central orifice 86, through which the valve block 73 passes.

The movement limiter 81 is advantageously a stepped washer.

The movement limiter 81 has a cylindrical portion 87, arranged around the valve block 73 and/or the inner proximal end 43. The cylindrical portion 87 is rigidly attached to the valve block 73 and/or to the inner proximal end 43. The movement limiter 81 further comprises a protruding flange 88 rigidly attached to the first cup 83.

The protruding flange 88 is arranged around the first central orifice 86.

The protruding flange 88 is formed at one end of the cylindrical portion 87.

Only the end 89 of the cylindrical part 87, opposite the protruding flange 88, is engaged in the orifice 79 of the internal reservoir 3.

Thus, if the movement limiter 81 has a given overall axial length, this movement limiter 81 is only engaged in the orifice 79 over a length of less than 50% of the said given overall length.

This prevents excessive radiant heat transfer between the movement limiter 81 and the edge of the orifice 79.

Each internal passage 74 has, at one end, a counterbore 93 formed in the connecting surface 78. A connecting sleeve 95 is rigidly attached in this counterbore 93. The corresponding circulation tube 75 is rigidly attached by one end to the connecting sleeve 95.

In addition, each circulation tube 75 is connected to the bottom plate 33 and communicates with the storage volume 5 through the bottom plate 33.

For this purpose, the bottom plate 33 has orifices 97, wherein other connecting sleeves 99 are engaged. Each circulation tube 75 is rigidly and tightly attached to one of the other connecting sleeves 99.

Each circulation tube 75 has a wall thickness of between 0.1 and 0.6 mm, preferably between 0.2 and 0.4 mm, for example 0.3 mm. These circulation tubes 75 are typically made of 316 L stainless steel.

To compensate for differential expansion between the or each circulation tube 75 and the outer tube 27, the or each circulation tube 75 comprises at least one thermal expansion compensator 101.

In fact, the or each circulation tube 75 may have a significantly lower temperature than the outer tube 27, particularly when the storage volume 5 is first filled. During this first filling operation, the storage volume 5 is at ambient temperature, as is the outer tube 27. Conversely, the circulation tubes 75 are at substantially the same temperature as the cryogenic fluid. For a 420 mm circulation tube 75, the contraction in length of the circulation tube 75 can then reach 1.6 mm when the cryogenic fluid is liquid hydrogen at 20 K.

In the example shown, each circulation tube 75 has a number of thermal expansion compensators 101 distributed along its length.

For example, the circulation tube 75 features three thermal expansion compensators 101, evenly spaced along the circulation tube 75.

The or each thermal expansion compensator 101 is advantageously a corrugated section of the circulation tube 75.

Each annular section comprises a plurality of annular zones 103 projecting outwards from the circulation tube 75, each delimiting an inner groove open toward the interior of the circulation tube 75. These projecting annular zones 103 are connected to one another by recessed annular zones 105 on the outside of the circulation tube 75. The recessed annular zones 105 bulge out toward the inside of the circulation tube 75, and between the projecting annular zones 103 delimit a groove open toward the outside of the circulation tube 75. Viewed in cross section in a plane containing the axis of the circulation tube 75, the corrugated section has a sinuous shape.

The circulation tubes 75 are straight and parallel to the central axis C.

The connection 23 also comprises an external thermal insulation 107, arranged between the intermediate tube 35 and the outer tube 27.

This external thermal insulation 107 extends from the distal intermediate end 39 over a length of less than 75% of the total length of the intermediate tube 35.

The external thermal insulation 107 is typically of the same type as thermal insulation 21. The external thermal insulation 107 comprises a plurality of aluminized metallic sheets or plastic sheets (for example PET or polyethylene terephthalate, PA or polyamide, PEEK or polyetheretherketone) superimposed on one another, with interposed layers of fibers.

The external thermal insulation 107 is preferably pressed against the intermediate tube 35. The external thermal insulation 107 covers the weld joining the intermediate distal end 39 to the annular ring 47. The external thermal insulation 107 also covers the radially outer surface of this annular ring 47. The external thermal insulation 107 extends over about 50% of the total length of the intermediate tube 35.

The connection 23 also comprises internal thermal insulation 109, arranged between the intermediate tube 35 and the inner tube 41.

This internal thermal insulation 109 extends from the inner proximal end 43 over a length of less than 75% of a total length of the inner tube 41.

The internal thermal insulation 109 is of the same type as the thermal insulation 21. It comprises a plurality of aluminized metal sheets or plastic sheets (for example PET, PA, PEEK) superimposed on one another, with interposed fiber layers. The internal thermal insulation 109 is pressed against the inner tube 41.

The internal thermal insulation 109 does not cover the weld joining the inner proximal end 43 to the valve block 73 or the movement limiter 81. The internal thermal insulation 109 starts a short distance from the bond weld. The internal thermal insulation 109 typically extends over about two-thirds of the total length of the inner tube 41.

Note that there is an axial overlap between the external thermal insulation 107 and the internal thermal insulation 109, as shown in FIG. 2.

As explained above, the usual mechanical stresses, such as emergency braking, hairpin turns by the vehicle, vibrations and impacts resulting from poor road surface conditions, generate displacements of the inner proximal end 43 of no more than 1 mm. These stresses therefore do not result in contact between the movement limiter 81 and the edge of the orifice 79.

Conversely, if the storage unit 1 is subjected to exceptional stress, such as in the event of an accidental vehicle impact, the inner proximal end 43 may be subjected to an acceleration of up to 10 G. In this case, the movement limiter

81 comes into contact with the edge of the orifice 79. This will limit deformation of the inner tube 41 and the intermediate tube 35. These tubes 41, 35 will not undergo irreversible plastic deformation. The movement limiter 81 is sufficiently rigid not to be deformed by such an impact.

Note that the external thermal insulation 107 only covers the area of the intermediate tube 35 where the temperature difference between the intermediate tube 35 and the outer tube 27 is greatest. The outer tube 27 is at the temperature of the cryogenic fluid, that is, around 20 K in the case of liquid hydrogen. The temperature of the intermediate tube 35 varies between 50 K at the intermediate proximal end 37 and 130 K at the intermediate distal end 39. The temperature difference is therefore greater proximate to the intermediate distal end 39. As a result, radiation from the intermediate tube 35 onto the outer tube 27 is greater at this point. Installing thermal insulation on this portion of the intermediate tube 35 is therefore a highly effective way of limiting heat transfer by radiation, without increasing costs excessively.

The internal thermal insulation 109 is also positioned in the zone where the temperature difference between the inner tube 41 and the intermediate tube 35 is greatest.

It should be noted that the changeover from a single tube to a suspension with two tubes (intermediate tube and inner tube) of low wall thickness, as disclosed in the application filed under number FR2207054, enables thermal inputs to be reduced from 6.9 W to 4 W for a typical example (hydrogen storage of a capacity suitable for a motor vehicle). By using particularly thin-walled cryogenic fluid circulation tubes, heat transfer can be reduced from 5 W to 3.5 W for the same example.

According to an alternative which is not shown in the first embodiment, the inner proximal end 43 of the inner tube 41 is extended and passes through the first central orifice 86. The first cup 83 is directly welded to the inner tube 41. The movement limiter 81 is arranged around the inner proximal end 43 and rigidly attached thereto.

An alternative of the first embodiment is now disclosed with reference to FIG. 3. Only the points whereby said alternative differs from that of FIG. 2 will be detailed below. Elements that are identical or provide the same functions will be designated by the same reference signs in both embodiments.

In the alternative embodiment, the movement limiter 81 is a ring attached to the internal reservoir 3.

The movement limiter 81 engages with the inner proximal end 43 of the inner tube 41.

Alternatively, the movement limiter 81 engages with the rigid member, that is, the valve block 73, or it engages with both the inner proximal end 43 and the rigid member.

The movement limiter 81 has an annular shape, centered on the central axis C.

Advantageously, it is continuous.

Alternatively, the movement limiter 81 can be made up of several separate segments arranged in a ring.

The movement limiter 81 is attached to the inner ring 51, typically on a face 111 of the inner ring 51 facing the outside of the internal reservoir 3.

The movement limiter 81 surrounds the orifice 79 and projects radially inwards from the orifice 79.

The inner proximal end 43 covers the outer surface 77 of the valve block 73. More specifically, it covers the part of the outer surface 77 facing the internal reservoir 3.

The inner proximal end 43 is rigidly attached to the valve block 73 by any suitable method, such as welding.

The end portion 76 of the valve block 73 is engaged in the inner proximal end 43. It has an outer cross section substantially identical to the inner cross section of the inner proximal end 43.

The first central portion 84 of the first cup 83 is rigidly attached directly to the inner proximal end 43.

The inner proximal end 43 is engaged through the first central orifice 86 of the first cup 83 and is welded to the edge of said orifice 86.

The movement limiter 81 has an inner diameter equal to the outer diameter of the inner proximal end 43, typically increased by 4 mm.

The movement limiter 81 is welded to the inner ring 51 after the intermediate tube 35, inner tube 41 and bottom 65 have already been welded to the inner ring 51.

The advantage of this solution is that the 2 mm clearance between the movement limiter 81 and the inner tube 41 is adjusted once the suspension is assembled. In other words, the position of the movement limiter 81 is adjusted by knowing the position of the inner proximal end 43 of the inner tube 41 relative to the inner ring 51.

In addition, the inner proximal end 43 of the inner tube 41 is elongated so that the inner tube 41 is welded directly to the first cup 83. This eliminates the need for an intermediate weld, as required in the first embodiment (welding the tube 41 to the valve block 73, then welding the first cup 83 to the valve block 73). This also eliminates a connection on the critical path of thermal load transfer.

A second embodiment of the disclosure will now be disclosed with reference to FIGS. 4 and 5. Only the points whereby the second embodiment differs from the alternative of FIG. 3 will be detailed below. Elements that are identical or provide the same functions will be designated by the same reference signs in both embodiments.

This method is particularly well suited to the connection 25, which is not designed for the passage of cryogenic fluid. The connection 25 is designed to suspend the end of the first reservoir opposite the fluid inlet and outlet orifices of the storage unit 1.

As a result, no valve block or cryogenic fluid circulation tube is integrated into the connection 25.

In contrast, the connection 25 comprises a second cup 113 having a second central portion 115 and a second edge 117 rigidly attached to the external reservoir 7 (FIG. 1).

The second central portion 115 faces the bottom 13 of the internal reservoir 3. The second edge 117 is rigidly attached to the inner surface of the external reservoir 7. This second cup 113 is, for example, of the type disclosed in the application filed under number FR2211366.

The connection 25 comprises a sliding tube 119 passing through a second orifice 120 in the second central portion 115.

The sliding tube 119 is coaxial with the central axis C.

The sliding tube 119 is rigidly attached to the second central portion 115, for example by welding.

The sliding tube 119 extends opposite the movement limiter 81 perpendicular to the central axis C. In other words, the movement limiter 81 is arranged around the sliding tube 119.

The inner proximal end 43 of the inner tube 41 is slidably engaged in the sliding tube 119.

The inner proximal end 43 is therefore connected to the sliding tube 119 with one degree of freedom, in axial translation.

As shown in FIG. 5, an inner surface of the sliding tube 119 has a coating 121 to facilitate sliding of the inner proximal end 43 in contact with the sliding tube 119.

For example, a radial clearance of 2 mm is provided between the movement limiter 81 and the sliding tube 119.

In this embodiment, the movement limiter 81 engages with the inner tube 41 to limit the deflection of this inner tube, indirectly through the sliding tube 119.

This sliding capability enables management of the variation in axial length of the internal reservoir 3 relative to the external reservoir 7. When the internal reservoir 3 is filled with cryogenic fluid, this reservoir 3 contracts under the effect of cooling. Its axial length decreases.

In the second embodiment, the connection 25 comprises a single layer of thermal insulation 123, replacing the internal 107 and external 109 thermal insulations. The thermal insulation 123 is arranged between the inner tube 41 and the intermediate tube 35, typically against the inner tube 41.

The thermal insulation 123 covers the inner cylindrical wall 63, and most of the inner tube 41. The thermal insulation 123 stops a short distance from the sliding tube 119.

According to an alternative which is not shown, the movement limiter 81 is attached to the sliding tube 119.

The movement limiter 81 engages with the orifice 79 through which the inner tube 41 passes.

The movement limiter 81 has the form of a sleeve.

The storage unit disclosed above has multiple advantages.

Providing that the movement limiter engages with the orifice of the internal reservoir to limit the inner tube's deflection makes it possible to use a particularly simple movement limiter. The deflection is controlled by selecting the appropriate gap between the inner surface of the orifice and the movement limiter.

The fact that the movement limiter is rigidly attached to the inner tube and/or to the rigid member means that the movement limiter can be conveniently positioned in the orifice.

The fact that the movement limiter is only engaged in the orifice for a length of less than 50% of its total length limits radiation transfer between the movement limiter and the internal reservoir.

Providing that the movement limiter is attached to the internal reservoir and engages with the inner proximal end and/or with the rigid member also makes it possible to use a particularly simple movement limiter. Adjustment of the clearance between the movement limiter and the inner tube is facilitated by the fact that the position of the movement limiter is adjusted once the suspension is assembled, knowing the position of the inner proximal end.

When the connection comprises a first cup having a first central portion rigidly attached directly to the inner proximal end and a first edge rigidly attached to the external reservoir, connection assembly is facilitated, as explained above. The number of welds on the thermal load path is reduced.

When the connection comprises a second cup having a second central portion and a second edge rigidly attached to the external reservoir, the connection comprising a tube passing through an orifice in the second central portion and rigidly attached to the second central portion, the inner proximal end being slidably engaged in the tube, the tube extending opposite the movement limiter perpendicular to the central axis, the connection allows thermal expansion or retraction of the internal reservoir, axially, relative to the external reservoir.

Providing that the connection comprises an intermediate tube arranged between the outer tube and the inner tube and an annular ring connecting the intermediate distal end to the inner distal end, means that the thermal path leading from the external reservoir to the internal reservoir by conduction passes first through the inner tube, then through the annular ring, and then through the intermediate tube. The heat flow therefore circulates through two tubes arranged one inside the other, so that the heat flow path is particularly long.

In addition, the presence of the movement limiter means that it is possible to use an intermediate tube and an inner tube, both of which have a particularly low wall thickness, between 0.5 mm and 2.5 mm, which helps to reduce the heat flow by conduction.

Providing that the suspension comprises external thermal insulation, arranged between the intermediate tube and the outer tube, and extending from the intermediate distal end over a length of less than 75% of a total length of the intermediate tube, is a highly effective way of limiting radiation transfer between the outer tube and the intermediate tube. The external thermal insulation is placed in the area where the temperature difference between the two tubes is greatest.

Providing that the suspension comprises internal thermal insulation, arranged between the intermediate tube and the outer tube, and extending from the inner proximal end over a length of less than 75% of a total length of the inner tube, also makes it possible to reduce radiation transfers between the intermediate tube and the inner tube. This internal thermal insulation is placed in the area where the temperature difference between the intermediate tube and the inner tube is greatest.

When each circulation tube has a wall thickness of between 0.1 and 0.6 mm, conductive heat transfer from the external reservoir to the internal reservoir can be drastically reduced.

In this case, it is advantageous to provide the circulation tube with at least one thermal expansion compensator, to allow differential expansion between the circulation tube and the outer tube.

The thermal expansion compensator is particularly convenient and economical to produce in the form of a corrugated tube section.

The storage unit may have multiple variants.

The connection may have no intermediate tube and no annular ring. The inner tube is then directly attached to the bottom plate. The connection is, for example, of the type disclosed in the patent application filed under number FR2207054.

The movement limiter may not be in the form of a stepped washer. For example, the movement limiter may be a simple cylindrical sleeve, attached to the valve block or to the inner tube, etc.

The rigid member is not necessarily the valve block. The rigid member may be for example a short tube, particularly rigid, attached to the inner proximal end and to the first cup.

According to another alternative, reliefs could be formed around the orifice 79, projecting outwards from the internal reservoir. The movement limiter may then be a cup attached to the valve block 73, with an edge raised toward the internal reservoir surface. The raised edge surrounds the reliefs, and limits the deflection of the inner tube and the valve block assembly by engaging with the reliefs.

The storage unit can have two connections with circulation tubes 77 and distributor block 73, or two connections without circulation tubes 77 or distributor block 73.

The connection without circulation tubes 77 or valve block 73 may not comprise a sliding tube. In this case, the inner tube 41 is directly attached to the second cup 113. The movement limiter 81 is a sleeve mounted directly on the inner proximal end 43 of the inner tube, or is attached to the internal reservoir 3 as disclosed above.

The disclosure has been shown and described in detail in the drawings and the preceding description. This must be considered as illustrative and given by way of example and not as limiting the disclosure to this only description. Many alternative embodiments are possible.

The invention claimed is:

1. A cryogenic fluid storage unit comprising:

an internal reservoir inwardly delimiting a cryogenic fluid storage volume, an external reservoir housing the internal reservoir, and a suspension attaching the internal reservoir to the external reservoir, the suspension comprising a connection which comprises:

an outer tube having an outer proximal end attached to the internal reservoir and an outer distal end located inside the cryogenic fluid storage volume;

a bottom plate closing the outer distal end;

an inner tube arranged inside the outer tube, the inner tube having an inner proximal end directly attached to a rigid member connected to the external reservoir and having an inner distal end attached to the internal reservoir; and a movement limiter limiting deflection of the inner tube relative to the internal reservoir in a plane perpendicular to a central axis of the inner tube, the movement limiter:

either being attached to the rigid member and/or to the inner proximal end; or being attached to the internal reservoir and engaging with the rigid member and/or the inner proximal end.

2. The cryogenic fluid storage unit according to claim 1, wherein the internal reservoir has an orifice through which the inner tube is connected to the external reservoir, the movement limiter engaging with the orifice to limit the deflection of the inner tube.

3. The cryogenic fluid storage unit according to claim 2, wherein the cryogenic fluid storage unit comprises:

a valve block having at least one internal passage for cryogenic fluid;

at least one circulation tube extending inside the inner tube and fluidly connecting the at least one internal passage to the cryogenic fluid storage volume;

the rigid member being the valve block.

4. The cryogenic fluid storage unit according to claim 3, wherein the movement limiter is a sleeve arranged around the valve block and/or the inner proximal end.

5. The cryogenic fluid storage unit according to claim 4, wherein the connection comprises a first cup having a first central portion rigidly attached directly to the valve block and/or to the inner proximal end, and a first edge rigidly attached to the external reservoir, the movement limiter comprising a cylindrical portion arranged around the valve block and/or the inner proximal end and rigidly attached to the valve block and/or to the inner proximal end, the movement limiter further comprising a protruding flange rigidly attached to the first cup.

6. The cryogenic fluid storage unit according to claim 2, wherein the movement limiter has a specific axial length and is engaged in the orifice over a length of less than 50% of said specific axial length.

7. The cryogenic fluid storage unit according to claim 1, wherein the movement limiter is a ring attached to the internal reservoir.

8. The cryogenic fluid storage unit according to claim 1, wherein the connection comprises a plurality of tubes coaxial with each other and arranged inside each other, the inner tube belonging to the plurality of tubes and being an innermost tube of the plurality of tubes.

9. A cryogenic fluid storage unit comprising:

an internal reservoir inwardly delimiting a cryogenic fluid storage volume, an external reservoir housing the internal reservoir, and a suspension attaching the internal reservoir to the external reservoir, the suspension comprising a connection comprising:

an outer tube having an outer proximal end attached to the internal reservoir and an outer distal end located inside the cryogenic fluid storage volume;

a bottom plate closing the outer distal end;

an inner tube arranged inside the outer tube, having an inner proximal end connected to the external reservoir and an inner distal end attached to the internal reservoir;

a cup having a central portion and an edge rigidly attached to the external reservoir;

a sliding tube passing through an orifice in the central portion and rigidly attached to the central portion, the inner proximal end being slidably engaged in the sliding tube; and a movement limiter, limiting a deflection of the inner tube relative to the internal reservoir in a plane perpendicular to a central axis of the inner tube, the movement limiter:

either being attached to the sliding tube; or being attached to the internal reservoir and engaging with the sliding tube.

10. The cryogenic fluid storage unit according to claim 9, wherein the sliding tube extends opposite the movement limiter perpendicular to the central axis.

11. The cryogenic fluid storage unit according to claim 9, wherein the connection comprises a plurality of tubes coaxial with each other and arranged inside each other, the inner tube belonging to the plurality of tubes and being an innermost tube of the plurality of tubes.

* * * * *